(12) United States Patent
Kanda (10) Patent No.: US 10,909,976 B2
(45) Date of Patent: Feb. 2, 2021

(54) SPEECH RECOGNITION DEVICE AND COMPUTER PROGRAM

(71) Applicant: National Institute of Information and Communications Technology, Tokyo (JP)

(72) Inventor: Naoyuki Kanda, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 124 days.

(21) Appl. No.: 16/097,250

(22) PCT Filed: Jun. 2, 2017

(86) PCT No.: PCT/JP2017/020689
§ 371 (c)(1),
(2) Date: Oct. 27, 2018

(87) PCT Pub. No.: WO2017/213055
PCT Pub. Date: Dec. 14, 2017

(65) Prior Publication Data
US 2019/0139540 A1    May 9, 2019

(30) Foreign Application Priority Data

Jun. 9, 2016  (JP) ................. 2016-115515

(51) Int. Cl.
*G10L 15/00* (2013.01)
*G10L 15/197* (2013.01)
(Continued)

(52) U.S. Cl.
CPC ............ *G10L 15/197* (2013.01); *G10L 15/14* (2013.01); *G10L 15/19* (2013.01); *G10L 15/22* (2013.01); *G10L 15/16* (2013.01)

(58) Field of Classification Search
CPC ....... G10L 15/14; G10L 15/197; G10L 15/16; G10L 15/22; G10L 15/00
(Continued)

(56) References Cited

U.S. PATENT DOCUMENTS 8,442,821 B1 *   5/2013  Vanhoucke ............. G10L 15/14
                                                                            704/232
9,697,475 B1 *   7/2017  Subramanya .......... G06N 7/005
(Continued)

FOREIGN PATENT DOCUMENTS

JP    2009-080309 A    4/2009
JP    2016-218309 A    12/2016
JP    2017-016131 A    1/2017

OTHER PUBLICATIONS

International Search Report for corresponding App. No. PCT/JP2017/020689, dated Aug. 29, 2017.
(Continued)

*Primary Examiner* — Michael Colucci
(74) *Attorney, Agent, or Firm* — Renner, Otto, Boisselle & Sklar, LLP (57) ABSTRACT

A speech recognition device includes: an acoustic model based on an End-to-End neural network responsive to an observed sequence formed of prescribed acoustic features obtained from a speech signal by feature extracting unit, for calculating probability of the observed sequence being a certain symbol sequence; and a decoder responsive to a symbol sequence candidate, for decoding a speech signal by a WFST based on a posterior probability of each of word sequences corresponding to the symbol sequence candidate, probabilities calculated by the acoustic model for symbol sequences selected based on an observed sequence, and a posterior probability of each of the plurality of symbol sequences.

9 Claims, 7 Drawing Sheets

(51) Int. Cl.
G10L 15/19 (2013.01)
G10L 15/14 (2006.01)
G10L 15/22 (2006.01)
G10L 15/16 (2006.01)

(58) Field of Classification Search
USPC .......................................................... 704/232
See application file for complete search history.

(56) References Cited

U.S. PATENT DOCUMENTS

| | | | | |
|---|---|---|---|---|
| 2001/0041978 | A1* | 11/2001 | Crespo | G10L 15/1815 704/257 |
| 2007/0255755 | A1* | 11/2007 | Zhang | G06F 16/78 |
| 2012/0065976 | A1 | 3/2012 | Deng | |
| 2013/0325442 | A1* | 12/2013 | Dahlmeier | G06F 40/274 704/9 |
| 2014/0358545 | A1* | 12/2014 | Robichaud | G10L 15/18 704/257 |
| 2015/0039301 | A1* | 2/2015 | Senior | G10L 15/16 704/232 |
| 2015/0112679 | A1* | 4/2015 | Zhang | G10L 15/14 704/243 |
| 2015/0269934 | A1* | 9/2015 | Biadsy | G10L 15/197 704/235 |
| 2016/0093294 | A1* | 3/2016 | Kapralova | G10L 15/01 704/232 |
| 2016/0140956 | A1* | 5/2016 | Yu | G10L 15/16 704/240 |
| 2016/0284349 | A1* | 9/2016 | Ravindran | G10L 15/20 |
| 2017/0004824 | A1 | 1/2017 | Yoo | |
| 2017/0103752 | A1* | 4/2017 | Senior | G06N 3/0445 |
| 2018/0204566 | A1 | 7/2018 | Kanda | |

OTHER PUBLICATIONS

Y. Miao, M. Gowayyed, and F. Metze, "EESEN: End-to-end speech recognition using deep RNN models and WFST-based decoding," in Proc. ASRU, 2015, pp. 167-174 (cited in Specification).

Dzmitry Bandanau, Jan Chorowski, Dmitriy Serdyuk, Philemon Brakel and Yoshua Bengio, "End-to-end attention-based large vocabulary speech recognition", in Proc. ICASSP, 2016, pp. 4945-4949 (cited in Specification).

A. Graves, S. Fernandez, F. Gomez, and J. Schmidhuber, "Connectionist temporal classification: labelling unsegmented sequence data with recurrent neural networks," in Proc. ICML. ACM, 2006, pp. 369-376.

A. L. Maas, A. Y. Hannun, D. Jurafsky, and A. Y. Ng, "First-pass large vocabulary continuous speech recognition using bi-directional recurrent DNNs," arXiv preprint arXiv:1408.2873, 2014.

A. Hannun, C. Case, J. Casper, B. Catanzaro, G. Diamos, E Elsen, R. Prenger, S. Satheesh, S. Sengupta, A. Coates et al., "Deepspeech: Scaling up end-to-end speech recognition," arXiv preprint arXiv:1412. 5567, 2014.

H. Sak, A. Senior, K. Rao, and F Beaufays, "Fast and accurate recurrent neural network acoustic models for speech recognition," in Proc. INTERSPEECH 2015, pp. 1468-1472.

H. Sak, A. Senior, K. Rao, O. Irsoy, A. Graves, F. Beaufays, and J. Schalkwyk, "Learning acoustic frame labeling for speech recognition with recurrent neural networks," in Proc. ICASSP, 2015, pp. 4280-4284.

A. Senior, H. Sak, F. de Chaumont Quitry, T. N. Sainath, and K. Rao, "Acoustic modelling with CD-CTC-SMBR LSTM RNNs," in Proc. ASRU, 2015, pp. 604-609.

A. L. Maas, Z. Xie, D. Jurafsky, and A. Y. Ng, "Lexicon-free conversational speech recognition with neural networks," in Proc. NAACL HLT, 2015.

A. Graves and N. Jaitly, "Towards end-to-end speech recognition with recurrent neural networks," in Proc. ICML, 2014, pp. 1764-1772.

H. Sak, et al., "Long short-term memory based recurrent neural network architectures for large vocabulary speech recognition", arXiv e-prints, 2014.

C. Weng, et al., "Recurrent deep neural networks for robust speech recognition", 2014 IEEE International Conference on Acoustics, Speech and Signal Processing (ICASSP). IEEE, 2014, pp. 5532-5536.

G. Saon, et al., "Unfolded recurrent neural networks for speech recognition", in Fifteenth Annual Conference of the International Speech Communication Association, 2014.

H. Sak, et al., "Sequence discriminative distributed training of long short-term memory recurrent neural networks", Interspeech 2014.

J.T. Geiger, et al.,"Robust speech recognition using long short-term memory recurrent neural networks for hybrid acoustic modelling", in Proceedings of the Annual Conference of International Speech Communication Association (INTERSPEECH), 2014.

Tatsuya Kawahara,"Onsei Ninshiki no Hohoron ni Kansuru Kosatsu-Sedai Kotai ni Mukete-", IPSJSIG Notes, Jan. 24, 2014 (Jan. 24, 2014), vol. 2014-SLP-100, No. 3, pp. 1-5.

George E. Dahl, et al.,"Context-Dependent Pre-Trained Deep Neural Networks for Large-Vocabulary Speech Recognition", IEEE Transactions on Audio, Speech, and Language Processing, Jan. 2012, vol. 20, No. 1, pp. 30-42.

Yotaro Kubo, et al.,"Integrating Deep Neural Networks into Structured Classification Approach based on Weighted Finite-State Transducers", Proc. INTERSPEECH 2012, Sep. 9, 2012, pp. 2594-2597.

Steve Renals, et al.,"Connectionist Probability Estimators in HMM Speech Recognition, IEEE Transactions on Speech and Audio Processing", Jan. 1994, vol. 2, No. 1, Part 2, pp. 161-174.

Naoyuki Kanda et al., "Maximum A Posteriori based Decoding for CTC Acoustic Models", in Proceedings of INTERSPEECH 2016, Sep. 8-12, 2016, pp. 1868-1872.

* cited by examiner

SPEECH RECOGNITION DEVICE AND COMPUTER PROGRAM

TECHNICAL FIELD

The present invention relates to a speech recognition device and, more specifically, to a speech recognition device performing highly accurate speech recognition using a neural network, as well as to a computer program thereof.

BACKGROUND ART

More and more devices and services are now using speech input/output as a man/computer interface. For instance, speech input/output is used for operating a portable telephone. As a basis of speech input/output, recognition accuracy of speech recognition devices must be as high as possible.

A common technique of speech recognition uses models obtained by statistical machine learning. For example, HMM (Hidden Markov Model) is often used as an acoustic model. Further, a word pronunciation dictionary for calculating the probabilities of phoneme sequences being obtained from character sequences generated in the process of speech recognition, and a language model for calculating the probabilities of appearances of word sequences of a certain language, are also used.

For performing such a process, a conventional speech recognition device includes: a framing unit for dividing the speech signals into frames; a feature generating unit for calculating features such as mel frequency cepstrum coefficients from each frame and forming a sequence of multi-dimensional feature vectors; and a decoder responsive to the sequence of feature vectors for outputting the word sequence having the highest likelihood of providing the sequence of feature vectors, utilizing the acoustic model and the language model. In calculating the likelihood, state transition probability and output probability from each state of HMM forming the acoustic model play important roles. These are both obtained through machine learning. The output probability is calculated by a pre-trained Gaussian mixture model.

Figure 1:
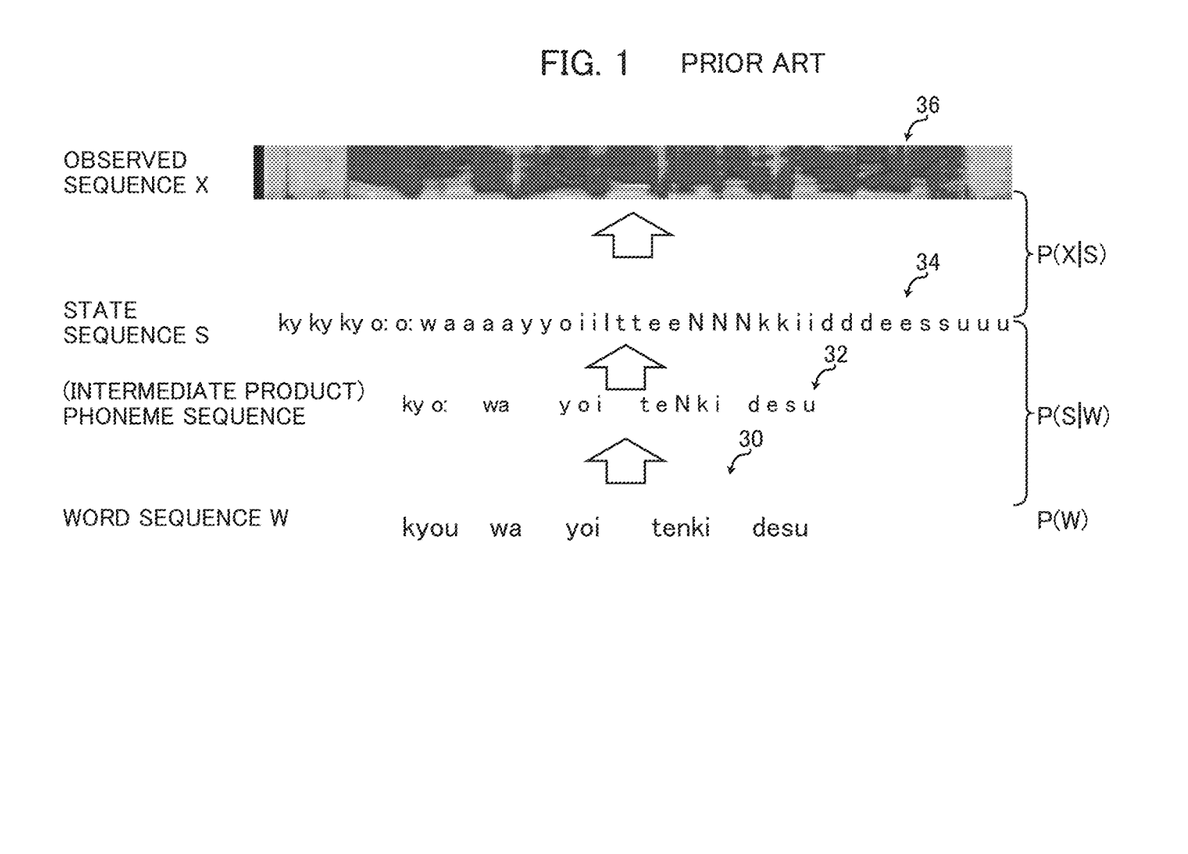
FIG. 1 shows a concept of conventional speech recognition.

Basic concept of speech recognition of a conventional speech recognition device using MINI will be described with reference to FIG. 1. Conventionally, it is assumed that a word sequence 30 (word sequence W) is influenced by various noises and observed as an input sequence 36 (observed sequence X), and a word sequence that is expected to have the highest likelihood of generating the finally observed sequence X is output as a result of speech recognition. Let P(W) represent the probability of a word sequence W being generated. Further, let P(S|W) represent the probability of a state sequence S (state sequence 34) of MINI being generated from the word sequence W through a phoneme sequence 32 as an intermediate product. Further, let P(X|S) represent the probability of observed sequence X being obtained from the state sequence S.

In the process of speech recognition, when an observed sequence $X_{1:T}$ from the start to a time point T is given, a word sequence that has the highest likelihood of generating such an observed sequence is output as a result of speech recognition. Specifically, the word sequence $\tilde{W}$ as the result of speech recognition is calculated by Equation 1 below.

$$\tilde{W} = \underset{W}{\operatorname{argmax}} P(W \mid X_{1:T}) \tag{1}$$

By modifying the right side of this equation in accordance with Bayes' theorem, we obtain $$\tilde{W} = \underset{W}{\operatorname{argmax}} \frac{P(X_{1:T} \mid W) P(W)}{P(X_{1:T})} \tag{2}$$

Further, the first term of the numerator can be calculated by HMM as $$P(X_{1:T} \mid W) \cong \underset{S_{1:T}}{\max} P(X_{1:T} \mid S_{1:T}) P(S_{1:T} \mid W) \tag{3}$$

Here, the state sequence $S_{1:T}$ represents a state sequence $S_1, \ldots, S_T$ of HMM. The first term of the right side of Equation (3) represents output probability of HMM. From Equations (1) to (3), the word sequence $\tilde{W}$ as the result of speech recognition can be given by $$\tilde{W} = \underset{W}{\operatorname{argmax}} \frac{P(X_{1:T} \mid S_{1:T}) P(S_{1:T} \mid W) P(W)}{P(X_{1:T})} \tag{4}$$

In HMM, an observed value $x_t$ at time point t depends only on the state $s_t$. Therefore, the output probability $P(X_{1:T}|S_{1:T})$ of HMM in Equation (4) can be calculated by the equation below.

$$P(X_{1:T} \mid S_{1:T}) = \prod_{t=1}^{T} P(X_t \mid S_t) \tag{5}$$

The probability $P(x_t|s_t)$ is calculated by Gaussian Mixture Model (GMM).

Among other terms of Equation (4), $P(S_{1:T}|W)$ is calculated by a product of state transition probability of HMM and pronunciation probability of a word, and P(W) is calculated by the language model. The denominator $P(X_{1:T})$ is common to each hypothesis and, therefore, it is negligible when arg max operation is executed.

Recently, a framework called DNN-HMM hybrid has been studied wherein output probability of HMM is calculated by a Deep Neural Network (DNN) in place of GMM. The hybrid method using DNN-HMM is attracting attention as it attains higher accuracy than an acoustic model using GMM. Here, originally, a DNN output represents posterior probability $P(S_t|X_t)$ and, therefore, it does not fit into the conventional framework using HMM that employs output probability $P(X_t|S_t)$. As a solution to this problem, Bayes' theorem is applied to the posterior probability $P(S_t|X_t)$ output from DNN to modify it into a form of the output probability $P(X_t|S_t)$.

Further, in view of superior results attained by DNN-HMM hybrid method, methods using convolutional neural network (CNN), recurrent neural network (RNN) or long short term memory network (LSTM) in place of DNN have been proposed. These methods are expected to attain higher accuracy of speech recognition. In DNN-HMM hybrid method, however, the neural network output represents posterior probability and, therefore, it is necessary to modify the neural network output by applying Bayes' theorem to forcefully apply Equation (5). A method of speech recognition that does not involve such a modification is expected to attain higher accuracy.

CITATION LIST

Non Patent Literature

NPL 1: Y. Miao, M. Gowayyed, and F. Metze, "EESEN: End-to-end speech recognition using deep RNN models and WFST-based decoding," in Proc. ASRU, 2015, pp. 167-174.
NPL2: Dzmitry Bandanau, Jan Chorowski, Dmitriy Serdyuk, Philemon Brakel and Yoshua Bengio, "End-to-end attention-based large vocabulary speech recognition", in Proc. ICASSP, 2016, pp 4945-4949.

SUMMARY OF INVENTION

Technical Problem

Recently, use of an End-to-End neural network (NN) as an acoustic model for speech recognition has been proposed (Non-Patent Literature 1). In End-to-End NN, posterior probability P(s|X) of symbol sequence s (such as a sequence of phonetic symbols) for an observed (acoustic feature) sequence X is directly represented, not by means of HMM or the like. Therefore, it may possibly be applied to speech recognition, without necessitating forced modification such as involved in DNN-HMM hybrid. An End-to-End NN will be described later with reference to an embodiment. Here, in order to discuss problems of the conventional methods, a concept of speech recognition using End-to-End RNN, which is generally used in an End-to-End NN, will be described. It is noted that the present invention is applicable to End-to-End NNs in general and not limited to RNN.

A RNN is structured such that it includes not only one-way connections between nodes from an input layer to an output layer but also connections between nodes from an output side layer to an adjacent input side layer, connections between nodes in the same layer, and/or self-loop connections. Because of this architecture, a RNN is capable of representing time-dependent information, which is a characteristic not found in ordinary neural networks. Speech is a typical example of time-dependent information. Therefore, a RNN is considered to be suitable for an acoustic model.

A label output from an End-to-End RNN represents, by way of example, an arbitrary sub-word such as a phoneme or a syllable. In principle, however, it is not limited to a sub-word and it may be any character or an indication of HMM state. As compared with HMM used as an acoustic model, an End-to-End RNN is expected to attain higher recognition accuracy as it does not necessitate forced modification of neural network outputs.

As described above, an End-to-End RNN learns direct mapping from an input observed sequence X to a sub-word sequence s. A model called Connectionist Temporal Classification (CTC) is a typical example of End-to-End RNN. In CTC, an observed sequence X is far longer than a sub-word sequence s and, therefore, in order to compensate for the difference of the length, a blank label $\phi$ is added to an output of RNN. Specifically, a node corresponding to the blank label $\phi$ is provided in the output layer. As a result, a frame-wise sub-word sequence $c=\{c_1, \ldots, c_T\}$ (including blank label $\phi$) is obtained at the output of RNN. This sub-word sequence c is converted to a sub-word sequence s that is independent of the number of frames, by introducing mapping function $\Phi$. The mapping function $\Phi$ removes blank labels $\phi$ from the frame-wise sub-word sequence c, and by regarding repetition of a label as one output, provides a sub-word sequence s independent of the number of frames. Mapping function $\Phi$ enables formulation of probability P(s|X) of observed sequence X being sub-word sequence s as follows.

$$P(s \mid X) = \sum_{c \in \Phi^{-1}(s)} P(c \mid X) \tag{6}$$

$$P(c \mid X) = \prod_{t}^{T} y^{c_t} \tag{7}$$

Here, $y_t^{c_t}$ is the output score of the RNN output label $c_t$ at time T. $\Phi^{-1}$ is inverse function of mapping function $\Phi$. Specifically, $\Phi^{-1}(s)$ represents a set of all phoneme sequences c that can be mapped to sub-word sequence s by the mapping function $\Phi$.

End-to-End NN is characterized in that the neural network directly learns the probability P(s|X) that the observed sequence X represents the sub-word sequence s. In Non-Patent Literature 2, a model called Attention-based Recurrent Sequence Generator is used as a method other than CTC.

Different from HMM, in End-to-End NN, the probability P(s|X) that the observed sequence X represents the sub-word sequence s is directly learned and, hence, a conventional decoding method using HMM cannot be employed. This NN also has the natures of both an acoustic model and a linguistic model. Therefore, at first, decoding using only the NN without using any language model was tried. It was found, however, that decoding without any language model could not provide the best results. Therefore, recently, use of a language model in addition to the End-to-End NN is dominant. Here, how to combine these two becomes a problem. Further, typically, learning of an acoustic model based on an End-to-End NN is done sub-word by sub-word (character, phoneme or the like) and, hence, the resulting score is also output sub-word by sub-word. Since the score of a language model is word by word, here again, how to combine these two becomes a difficult problem.

Conventionally, as a method of combining scores of these two, a simple interpolation of both scores as represented by the following equation was used to compute word sequence $\tilde{W}$.

$$\tilde{W} = \underset{W}{\mathrm{argmax}}\{\alpha \cdot \log P(s \mid X) + \log P(W)\} \tag{8}$$

It is noted that this calculation is under the following restriction.

$$s \in \Psi(W) \tag{9}$$

Here, $\Psi$ is a function that converts word sequence W into a set of all possible sub-word sequences s. A word insertion penalty is often incorporated here. Non-Patent Literature 1 proposes dividing posterior probability by prior probability $P(c_t)$ in each frame.

In decoding, it is necessary that the word sequence W and the sub-word sequence s must satisfy the relation (Equation (9)) that the former is a word and the latter is its sub-word. Such a restriction can be represented by a decoding method using WFST (Weighted Finite-State Transducer). In Non- Patent Literature 1, WFST for this purpose is formed by composing a token FST, a lexicon FST and a grammar FST in the following manner.

$$T \cdot \min(\det(L \cdot G)) \quad (10)$$

T is a token FST converting a frame-by-frame sub-word sequence c from a frame-by-frame NN to a sub-word sequence s independent of the number of frames. L is a lexicon FST converting the sub-word sequence s to a word sequence W. G is a grammar FST converting the word-sequence W to a weighed word sequence with weight P(W). When an observed sequence X comprised of acoustic features is given, the best (having highest probability) hypothesis is searched for with a beam search algorithm on this search graph, and it is output as a result of speech recognition. The WFST obtained by composing T, L and G as shown in Equation (10) is called TLG-WFST here.

Using a score calculated by such interpolation has no theoretical ground and sufficiently high recognition performance is not attained, either.

Therefore, an object of the present invention is to provide a speech recognition device capable of improving speech recognition accuracy by making use of neural network characteristics.

Solution to Problem

According to a first aspect, the present invention provides a speech recognition device, including: an acoustic model based on an End-to-End NN responsive to an observed sequence formed of prescribed acoustic features obtained from a speech signal, for calculating probability of the observed sequence being a certain symbol sequence; posterior probability calculating means responsive to a symbol sequence candidate, for calculating a posterior probability of a word sequence corresponding to the symbol sequence candidate; and a decoder for decoding the speech signal based on probabilities calculated by the acoustic model for a plurality of symbol sequences selected based on an input observed sequence, and a posterior probability calculated by the posterior probability calculating means for each of the plurality of symbol sequences.

The acoustic model may be an acoustic model based on CTC.

Preferably, the posterior probability calculating means includes a word sequence posterior probability calculating means responsive to a symbol sequence candidate, for calculating a posterior probability of a word sequence for the symbol sequence candidate, using an occurrence probability of a word sequence by a word level language model, a posterior probability of the symbol sequence candidate for each word sequence, and an occurrence probability of the symbol sequence candidate by a symbol level language model.

More preferably, the word sequence posterior probability calculating means calculates a posterior probability of a word sequence for each symbol sequence candidate by dividing a product of the occurrence probability of a word sequence and the posterior probability of a symbol sequence candidate by the occurrence probability of the symbol sequence.

The decoder may include: a WFST composing elements including a lexicon FST converting a sub-word sequence s to and outputting a word sequence W having a sub-word posterior probability P(s|W) added, a grammar FST converting the word sequence W to and outputting a word sequence W having an occurrence probability P(W) based on a language model of word sequence level added, and a sub-word FST outputting a sub-word sequence s having an occurrence probability $P(s)^{-\beta}$ based on a language model of a sub-word level added; and a hypothesis selecting means for outputting, as a result of decoding, a hypothesis having the highest score among hypotheses of word sequences received by the WFST. Here, β is a prescribed scaling factor.

Further, if CTC is used as the End-to-End NN, the decoder may use a WFST composing a token FST converting a label sequence output from the CTC to a sub-word sequence s; a lexicon FST converting the sub-word sequence s to a word sequence W having a sub-word posterior probability P(s|W) added; a grammar FST converting the word sequence W to a word sequence W having an occurrence probability P(W) added; and a sub-word FST outputting a sub-word sequence s having an occurrence probability $P(s)^{-\beta}$ in accordance with a sub-word level language model added.

Preferably, the decoder calculates the word sequence $\tilde{W}$ of the result of speech recognition for the observed sequence in accordance with the equation below.

$$\tilde{W} = \underset{W}{\operatorname{argmax}} \frac{P(s|W)P(W)}{P(s)^{\beta}} P(s|X)^{\alpha}$$

where P(s|W) represents posterior probability of sub-word sequence for the word sequence W, P(W) represents occurrence probability of word sequence W, P(s) represents occurrence probability of pronunciation sequence s, P(s|X) represents an acoustic model score of the pronunciation sequence s for the observed sequence X, and α and β are prescribed scaling factors.

According to a second aspect, the present invention provides a computer program causing a computer to function as any of the speech recognition devices described above.

DESCRIPTION OF EMBODIMENTS

In the following description and in the drawings, the same components are denoted by the same reference characters. Therefore, detailed description thereof will not be repeated.

Figure 2:
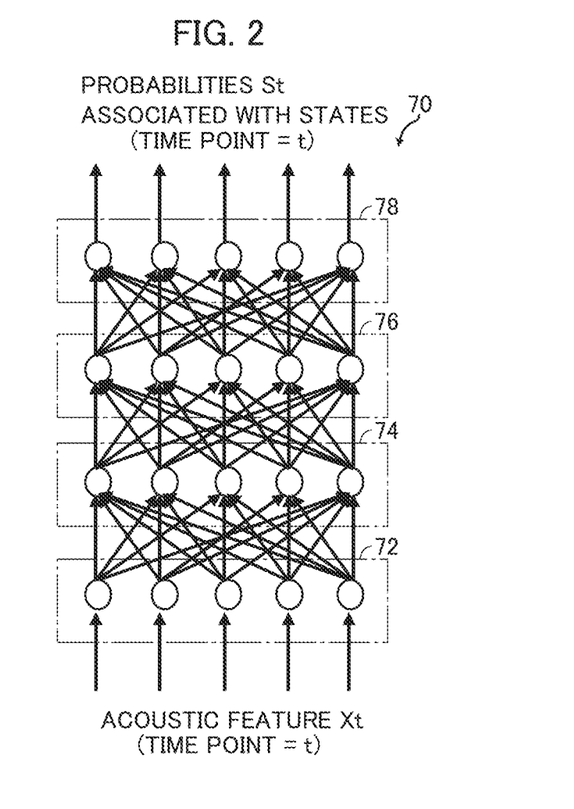
FIG. 2 schematically shows architecture of a common DNN.

First, differences between a DNN used in the conventional art and a RNN will be described. Referring to FIG. 2, a DNN 70 includes an input layer 72, an output layer 78, and a plurality of hidden layers 74 and 76 provided between input layer 72 and output layer 78. Though only two hidden layers are shown in this example, the number of the hidden layers is not limited to two. Each layer has a plurality of nodes. In FIG. 2, the number of nodes in each layer is the same, i.e., five. Generally, however, the numbers differ layer by layer. Adjacent nodes are connected to each other. It is noted, however, that data flows only in one direction, from the input side to the output side. Weight and bias are allocated to each connection. These weights and biases are learned by error back propagation using training data.

In DNN 70, when an acoustic feature $X_t$ at time point t is given to input layer 72 at time point t, probabilities $S_t$ associated with states are output from output layer 78. An acoustic model is often designed such that the number of nodes of the output layer 78 is the same as the number of phonemes of the language to be handled. In that case, the output of each node in the output layer represents the probability of an input acoustic feature being the phoneme represented by that node. Therefore, the sum of probabilities associated with states of respective nodes of output layer 78 becomes 1.

What is calculated by the DNN shown in FIG. 2 is $P(S_t|X_t)$. In other words, it is the probability of HMM state $S_t$ when an acoustic feature $X_t$ is observed at time t. The state $S_t$ of HMM corresponds to a phoneme. When compared with Equation (5), it can be seen that the output from a DNN cannot be applied (input) directly to Equation (5). Therefore, conventionally, the DNN output is converted to $P(X_t|S_t)$ using Bayes' theorem, as shown below.

$$P(x_t \mid s_t) = \frac{P(s_t \mid x_t)P(x_t)}{P(s_t)} \quad (11)$$

$$\propto \frac{P(s_t \mid x_t)}{P(s_t)}$$

In Equation (11), $P(x_t)$ is common to each HMM state and, therefore, it is negligible in arg max operation. $P(s_t)$ can be estimated by counting the number of states in aligned training data.

To sum up, in the DNN-HMM hybrid method, the output $P(S_t|X_t)$ of DNN is divided by the probability $P(S_t)$, thereby calculating the recognition score using a DNN in a conventional framework using HMM.

Figure 3:
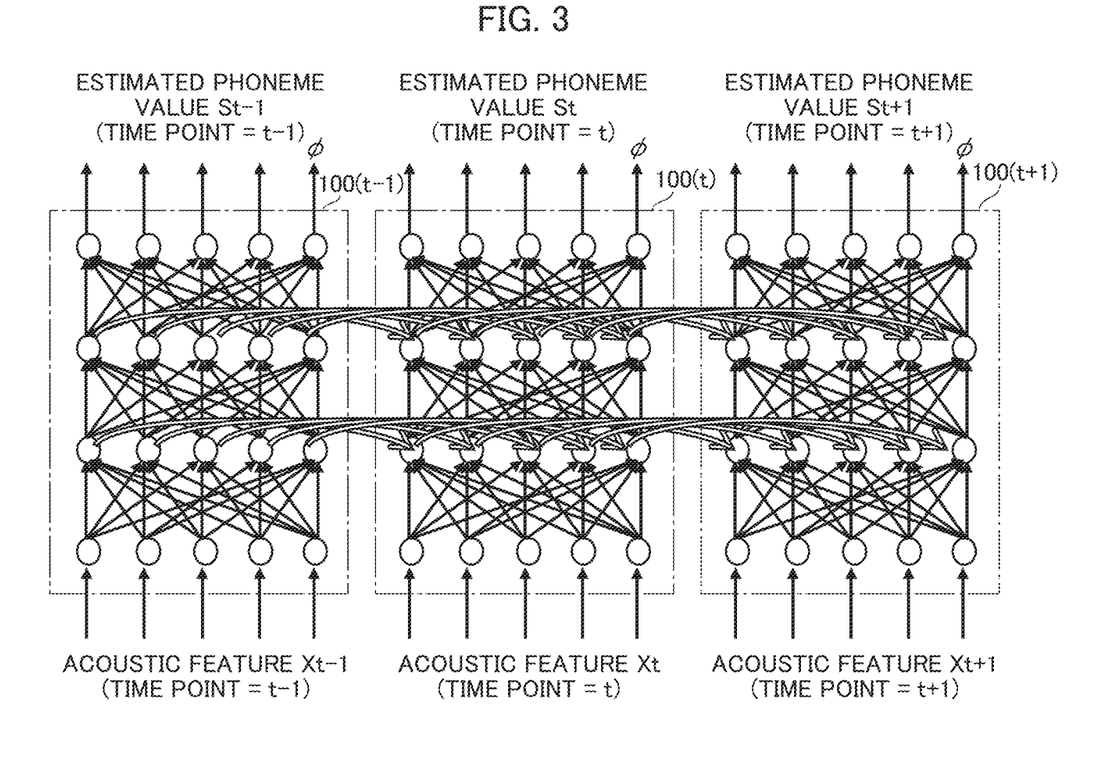
FIG. 3 schematically shows an example of architecture of a RNN and connections between nodes of RNNs at different time points.

In contrast, FIG. 3 shows exemplary architecture of End-to-End RNN. FIG. 3 shows a relation among RNN 100(t−1) at time point t−1, RNN 100(t) at time point t, and RNN (t+1) at time point t+1. In this example, each of the nodes of the hidden layers of RNN 100(t) receives not only the output from each node of the input layer but also the output from itself in RNN 100(t−1). In other words, RNN 100 is capable of generating an output for a time sequence of input acoustic features. Further, among End-to-End RNNs, in a model called CTC (Connectionist Temporal Classification), a node corresponding to a blank label ϕ (shown on the right end in FIG. 3) is included in addition to nodes corresponding to labels (for example, phonemes) in the output layer of RNN. Therefore, the number of nodes of the output layer is the number of labels+1.

The End-to-End RNN such as shown in FIG. 3 directly models the probability P(s|X) that the speech (acoustic features) X is the pronunciation sequence s. Therefore, speech recognition using such a RNN does not depend on HMM. The output of RNN can be formulated as represented by Equations (6) and (7) above. These equations are shown again below.

$$P(s \mid X) = \sum_{c \in \Phi^{-1}(s)} P(c \mid X) \quad (6)$$

$$P(c \mid X) = \prod_t^T y^{c_t} \quad (7)$$

Figure 4:
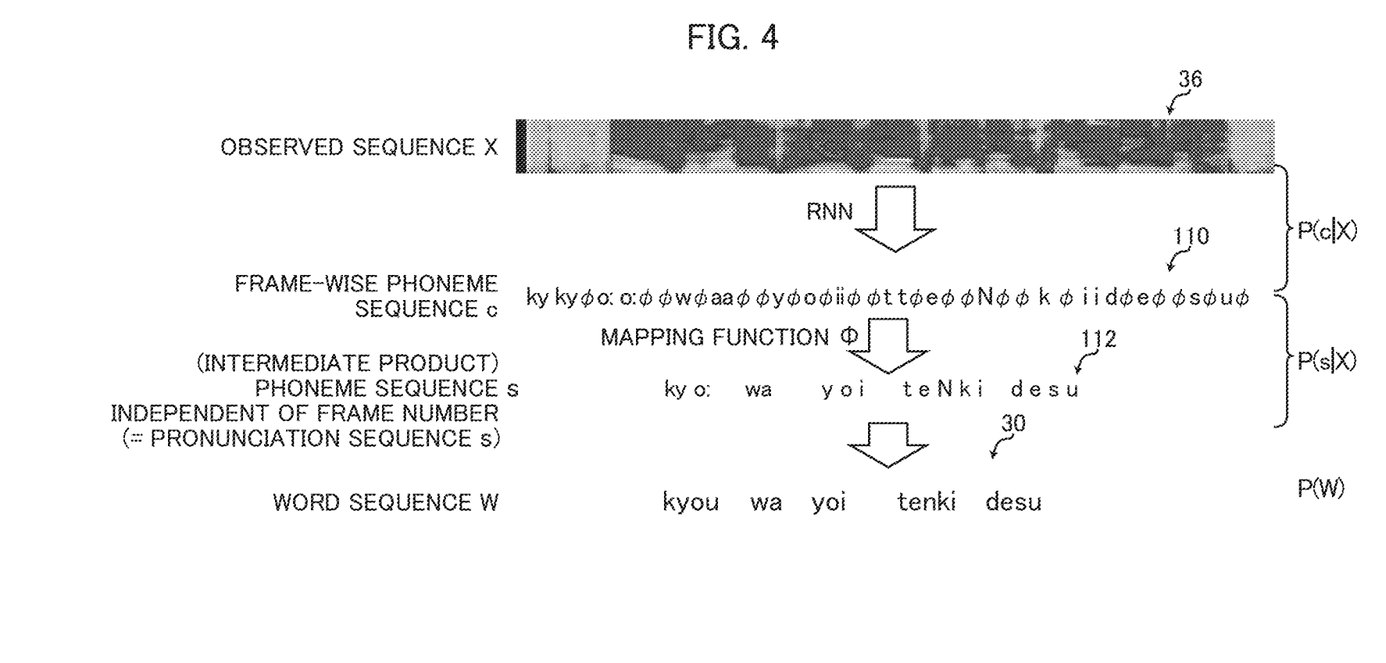
FIG. 4 shows a concept of speech recognition in accordance with an embodiment of the present invention.

It is necessary to use a framework other than the DNN-HMM hybrid method to realize highly accurate speech recognition while making full use of the End-to-End RNN characteristics. FIG. 4 proposes such a new framework. The present embodiment is directed to a device performing speech recognition in accordance with this framework. In the present embodiment, CTC is used as the End-to-End RNN, and a pronunciation sequence is used as a unit of sub-word. Based on the new framework to perform speech recognition making full use of the characteristics of End-to-End RNN, decoding method using CTC is improved.

Referring to FIG. 4, in the present embodiment, from input sequence 36 (observed sequence X), using RNN, the probability for each of phoneme sequences c (label sequences 110) consisting of label sequences including blank label ϕ is calculated. The probability is modeled as represented by Equation (7) above. By applying mapping function Φ to these phoneme sequences c, a plurality of pronunciation sequences s (symbol sequences 112) are obtained as intermediate products. For example, label sequences "AAϕϕBϕCCϕ," and "ϕAϕBBϕCϕ" are both mapped to the sub-word sequence "ABC" by applying the mapping function Φ. By this mapping function, the probability of pronunciation sequence s given observation sequence X is modeled as Equation (6) above. Here, the probability for each of word sequences 30 obtained from pronunciation sequences s (symbol sequences 112) is further calculated. This probability is modeled as P(W) by a word-level language model. Eventually, a word sequence 30 that is found to have the highest probability is output as the result of speech recognition. From the relations above, the word sequence $\tilde{W}$ as the result of speech recognition for the observed sequence $X_{1:T}$ is obtained by the equation below.

$$\tilde{W} = \underset{W}{\operatorname{argmax}} P(W \mid X) \quad (12)$$

This can be transformed/approximated as follows.

$$\tilde{W} = \underset{W}{\operatorname{argmax}} P(W \mid X) \quad (13)$$

$$= \underset{W}{\operatorname{argmax}} \sum_s P(W \mid s) P(s \mid X)^\alpha$$

$$\cong \underset{W}{\operatorname{argmax}} P(W \mid s) P(s \mid X)^\alpha$$

In Equation (13), P(s|X) represents posterior probability of CTC acoustic model, and α is its scaling factor. Pronunciation sequence s and observed sequence X must satisfy the constraints of Equation (9). Viterbi algorithm is used for approximation of Equation (13). At the timing of RNN training, P(W|s) is calculated over all s's in accordance with the second equation of Equation (13), while at the time of decoding, approximation is often performed in accordance with the third equation.

In Equation (13), P(W|s) can be calculated as represented by Equation (14) below.

$$P(W \mid s) = \frac{P(s \mid W)P(W)}{P(s)^\beta} \quad (14)$$

In Equation (14), P(s) is a sub-word-wise language model probability and β is its scaling factor. P(s) can be calculated using conventional language modeling techniques such as N-gram language model or neural network. Here, a sub-word-wise language model must be trained by a sub-word corpus. A sub-word corpus can be easily realized by converting words to sub-words in a typical text corpus.

The first term of the numerator of Equation (14), P(s|W), represents a word-sub-word conversion probability. Conversion from a word to a sub-word is, in many cases, one-to-one conversion (for example, decomposition of a word to individual letters). In such a case, P(s|W) is 1, and Equation (14) can be simplified to Equation (15) below.

$$P(W \mid s) = \frac{P(W)}{P(s)^\beta} \quad (15)$$

The foregoing can be summarized as follows. By replacing P(W|s) of Equation (13) with the right side of Equation (14), we obtain Equation (16) below. Scores of hypotheses are calculated in accordance with Equation (16), and the hypothesis having the highest score is selected as the result of speech recognition.

$$\tilde{W} = \underset{W}{\operatorname{argmax}} \frac{P(s \mid W)P(W)}{P(s)^\beta} P(s \mid X)^\alpha \quad (16)$$

To sum up, the conventional method using RNN calculates the score of recognition by interpolating the posterior probability output from RNN and the language model probability as represented by Equations (6) to (9). In contrast, by the method in accordance with the present embodiment, as is shown by Equation (16), a score of a hypothesis is calculated by dividing a product of the word-sub-word conversion probability P(s|W) for a hypothesis, the word language model score P(W) obtained from a word level language model as used in the conventional approach, and the sub-word posterior probability P(s|X)$^\alpha$ output from RNN, by the probability P(s)$^\beta$ which is the probability obtained from a sub-word level language model. This score is calculated for every hypothesis, and the hypothesis attaining the highest score is selected as the result of speech recognition. The decoder for this purpose can be realized by WFST, as in the case of TLG-WFST represented by the Equation (10) of the conventional method. The WFST is realized by composing the WFST of TLG with an FST (represented by "s") corresponding to P(s)$^\beta$. As can be seen from Equation (16), since the WFST is multiplied by P(s) raised to the power −β, the WFST can be represented by Equation (17) below in accordance with the manner of expression of Equation (10). This WFST will be called TS$^{-\beta}$LG-WFST.

$$T \cdot \min(\det(S^{-\beta} \cdot L \cdot G)) \quad (17)$$

It is noted that WFST T is preferably used when CTC is used as the End-to-End neural network. When an End-to-End model other than CTC is used, it is possible to use Equation (17) with only T removed.

Figure 5:
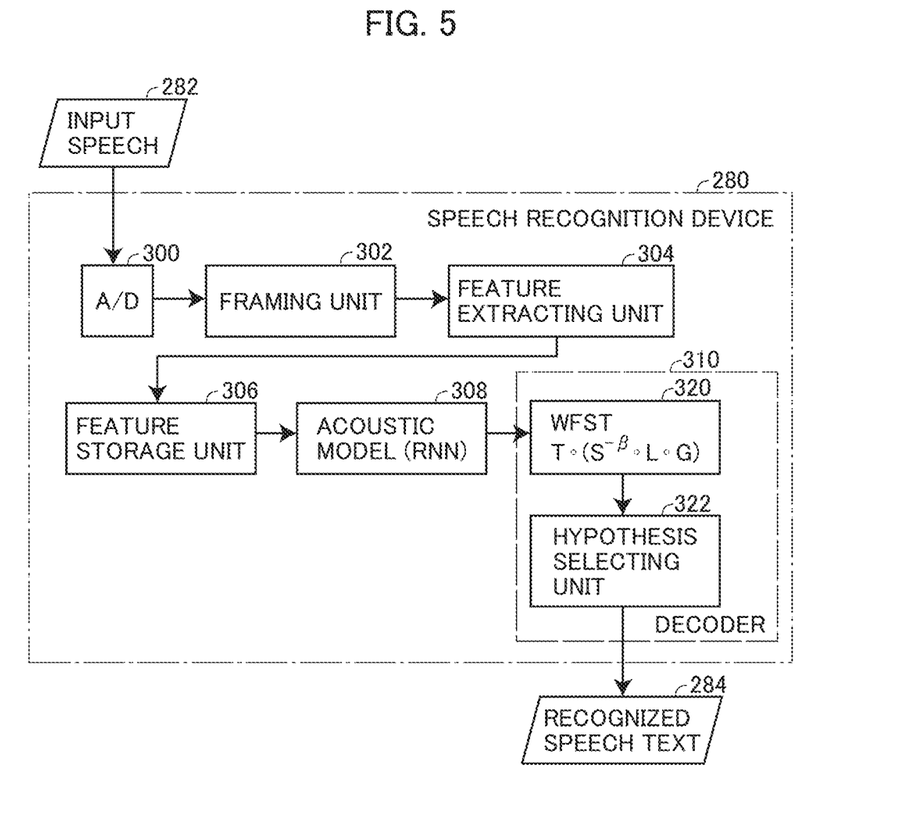
FIG. 5 is a block diagram showing a configuration of a speech recognition device in accordance with an embodiment of the present invention.

Referring to FIG. 5, a speech recognition device 280 in accordance with the present embodiment has a function of performing speech recognition of an input speech 282 and outputting a recognized speech text 284. Speech recognition device 280 includes: an A/D converter circuit 300 performing analog/digital (A/D) conversion to input speech 282 and outputting the result as a digital signal; a framing unit 302 for framing the digitized speech signal output from A/D converter circuit 300 using windows with a prescribed length and prescribed shift length allowing partial overlapping; and a feature extracting unit 304 performing a prescribed signal processing on each of the frames output by framing unit 302, thereby extracting acoustic features of each frame and outputting a feature vector. Each frame and each feature vector have information such as relative time, for example, with respect to the head of input speech 282. The acoustic features used may include MFCCs (Mel-Frequency Cepstrum Coefficients), their first order differentials, second order differentials, power and so forth, while the output of filter bank may be directly used as the features. Time-sequentially obtained feature vectors form an observed sequence.

Speech recognition device 280 further includes: a feature storage unit 306 for temporarily storing the feature vectors output by feature extracting unit 304; an acoustic model 308 implemented by an End-to-End RNN based on CTC, receiving as an input a feature vector stored in feature storage unit 306 and for outputting a vector representing for each phoneme posterior probabilities of each frame at each time point corresponding to the phonemes; and a decoder 310 for outputting, using the vectors output from acoustic model 308, a word sequence having the highest score (probability) as a recognized speech text 284 corresponding to the input speech 282, by means of TS$^{-\beta}$LG-WFST. Use of an End-to-End acoustic model 308 based on CTC and use of a WFST configured in advance in accordance with the direct decoding method as a speech recognition decoder are the differences over the conventional examples. The elements of vectors output from acoustic model 308 are values representing, phoneme by phoneme, the probability of the frame being each phoneme. By selecting one phoneme in each frame from the time-sequentially obtained vectors, concatenating the phonemes and representing each phoneme by a corresponding label, a label sequence candidate is obtained. The label sequence candidate may include a blank label ϕ. The posterior probability of each label sequence candidate can be calculated from the posterior probability of phonemes forming the label sequence candidate.

Decoder 310 includes: a TS$^{-\beta}$LG-WFST 320 calculating a plurality of hypotheses possibly represented by the input observed sequence and their probabilities using posterior probabilities of label sequence candidates calculated by the acoustic model and outputting the results as respective recognition scores; and a hypothesis selecting unit 322 outputting, based on the recognition scores calculated by TS$^{-\beta}$LG-WFST 320, a hypothesis having the highest probability as the recognized speech text 284.

Speech recognition by WFST is as follows. As a model of state transition machine, finite automaton has been known. Finite automaton is a basic concept of computational theory, and one thereof makes a state transition in accordance with predetermined rules in response to an input symbol sequence, and determines, based on the result of state transition, whether or not the input symbol sequence is to be accepted. FST is derived from this of automaton, and it is a transducer that makes a state transition upon reception of a certain symbol sequence and, at the same time, outputs a different symbol sequence. FST can be represented as a graph including nodes and arcs connecting nodes. A node represents a state, and an arc represents a state transition. Each arc has an input symbol and an output symbol attached. WFST has a weight further added to each arc, and by this weight it becomes possible to represent the concept of probability. By tracing from a root node through arcs, a hypothesis is generated, and by multiplying the weights (probabilities) allocated to these arcs, it is possible to calculate the probability of occurrence of that hypothesis.

Various models are used in speech recognition. HMM, a word pronunciation dictionary and a language model can all be represented by WFST. Further, recently, a phoneme-based triphone HMM comes to be used for representing phoneme context, and it can also be represented by WFST. A word pronunciation dictionary is WFST converting a phoneme sequence to a word sequence, used for finding vocabularies. A language model is, for example, a trigram language model, realized by WFST outputting an output word sequence that is identical to an acceptable one of the input word sequences with a weight corresponding to its probability, and it represents grammar of a language.

As described above, WFST involves an operation called "composition." The method of composing a plurality of WFSTs has an established theory, and its methodology and an algorithm for composing WFSTs by a computer program are also established. Composition of two WFSTs enables processing of tasks that otherwise requires application of two successive WFSTs, by the composed WFST. Therefore, it is possible to successively compose the combination of T, L and G described above as well as $S^{-\beta}$ to form one WFST and to use this for decoding. Decoder 310 uses such a pre-trained and composed WFST. It is noted, however, that different from a conventional approach, L represents a sub-word based lexicon FST, which converts a sub-word sequence s to a word sequence W with the probability of P(s|W).

Further, as described above, grammar FST(G) is an FST that adds language model probability P(W) as a weight to an input word sequence W, and receives and outputs a word sequence in accordance with the language model. $S^{-\beta}$-FST is a reverse to this, and it adds $P(s)^{-\beta}$ as a weight to an input sub-word sequence. Therefore, $S^{-\beta}$-FST can be generated in the same manner as grammar FST(G).

The number of nodes of the input layer of RNN forming acoustic model 308 in accordance with the present embodiment is the same as the number of elements of the feature vector. The number of nodes of the output layer of RNN is the same as the number of sub-words of the object language plus 1. Specifically, the nodes of output layer represent each of the sub-words (for example, phonemes) of the acoustic model based on HMM and a blank label φ. At each node of the output layer, probability of a speech input at a time point being the sub-word (including a blank label) represented by that node is output. Therefore, an output from acoustic model 308 is a vector having, as elements, the probabilities of input speech at that time point being the sub-words represented by respective nodes. The sum of element values of this vector is 1.

$TS^{-\beta}$ LG decoder 310 calculates probabilities of word sequences W by WFST 320 of $TS^{-\beta}$ LG described above for each element of the vector output from acoustic model 308, and traces the WFST graph while appropriately performing pruning, whereby a recognition score including hypothesis and probability calculation is computed. Hypothesis selecting unit 322 finally outputs a word sequence having the highest recognition score (high probability of occurrence) among the word sequences eventually received by WFST 320, as recognized speech text 284. Here, WFST 320 calculates the recognition score, directly using output from the RNN. Different from the conventional DNN-HMM framework, it is unnecessary to convert RNN outputs to make them consistent with the output format of HMM and, hence, recognition efficiency can be improved. Further, posterior probability P(s|X) obtained from End-to-End NN and probability P(W|s) are combined to calculate word posterior probability P(W|X), whereby a hypothesis having the highest word posterior probability P(W|X) is searched for. Different from the conventional methods using an End-to-End NN that involve interpolation scores without any rationale, it is also theoretically possible to improve recognition accuracy.

[Effects of the Embodiment]

The embodiment described above relates to a direct decoding speech recognition device using an End-to-End NN in place of the DNN-HMM hybrid method. Experimental results show that the direct decoding type speech recognition device with the smaller configuration exhibits comparable or higher performance than the DNN-HMM hybrid method. Further, it has been confirmed that this method attains higher accuracy than the direct decoding method using an End-to-End NN that calculates the recognition score by interpolation such as represented by Equation (8).

[Computer Implementation]

Figure 6:
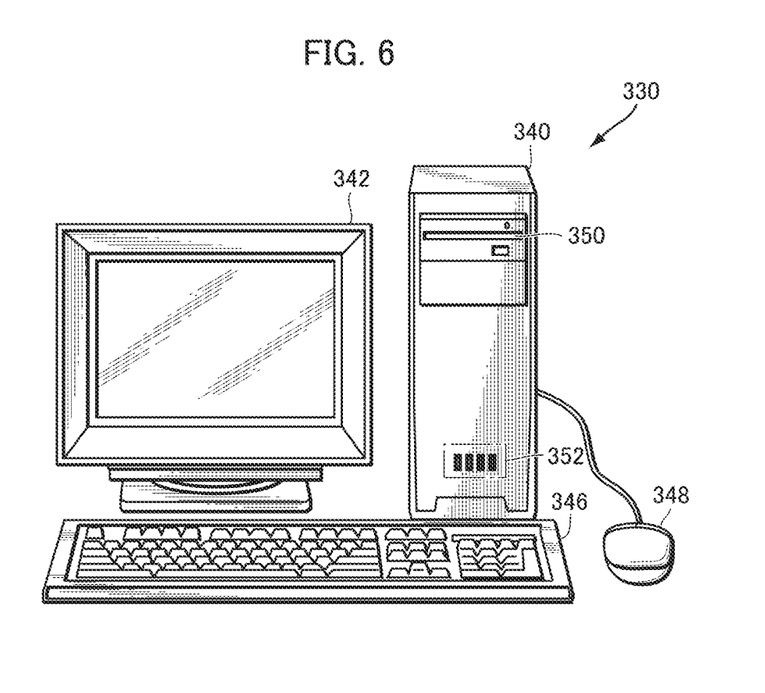
FIG. 6 shows an appearance of a computer implementing the speech recognition device in accordance with an embodiment of the present invention.

Speech recognition device 280 in accordance with the embodiments of the present invention can be implemented by computer hardware and the computer program running on the computer hardware. FIG. 6 shows an appearance of computer system 330 and FIG. 7 shows an internal configuration of computer system 330.

Referring to FIG. 6, computer system 330 includes a computer 340 having a memory port 352 and a DVD (Digital Versatile Disc) drive 350, a keyboard 346, a mouse 348 and a monitor 342.

Figure 7:
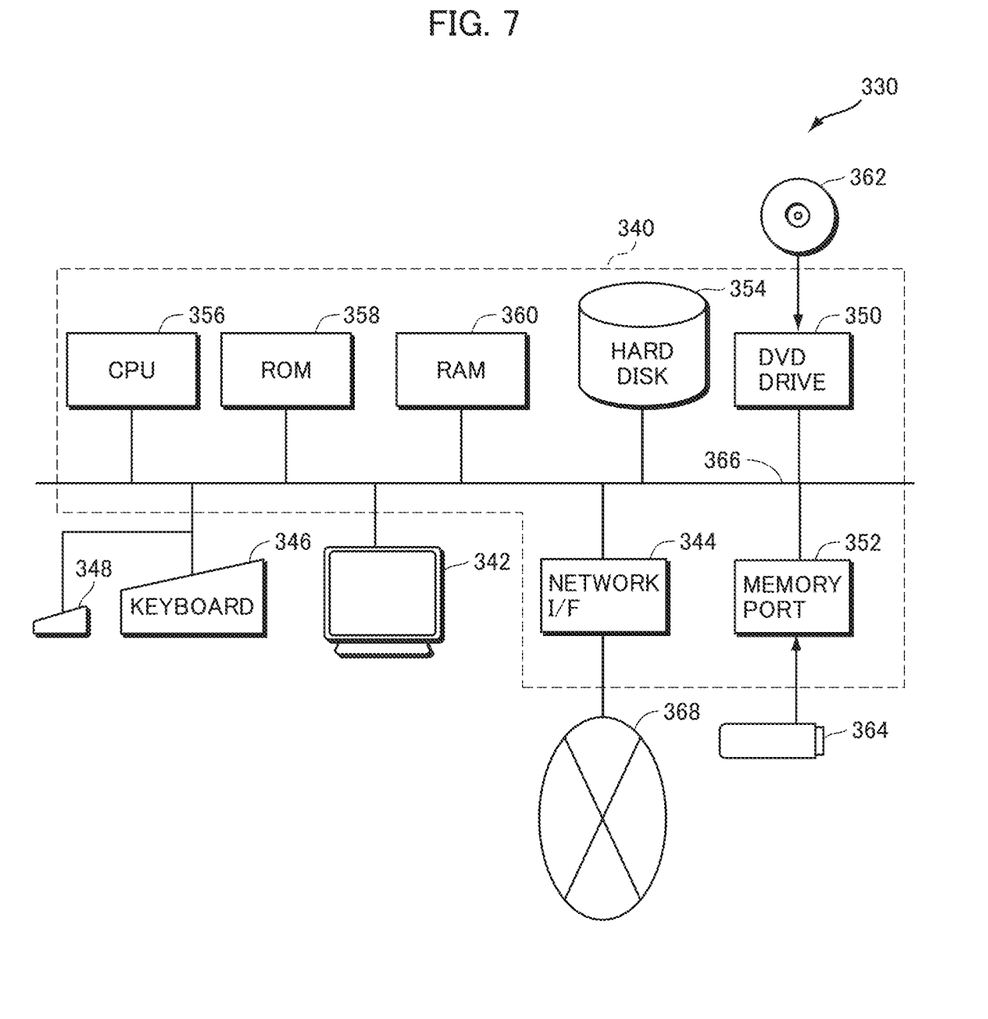
FIG. 7 is a block diagram showing hardware configuration of the computer shown in FIG. 6.

Referring to FIG. 7, in addition to memory port 352 and DVD drive 350, computer 340 includes a CPU (Central Processing Unit) 356, a bus 366 connected to CPU 356, memory port 352 and DVD drive 350, a read only memory (ROM) 358 for storing a boot program and the like, a random access memory (RAM) 360 connected to bus 366 and storing program instructions, a system program and work data, and a hard disk 354. Computer system 330 further includes a network interface (I/F) 344 providing a connection to a network 368, enabling communication with other terminals.

The computer program causing computer system 330 to function as various functional units of speech recognition device 280 in accordance with the above-described embodiments is stored in a DVD 362 or removable memory 364 loaded to DVD drive 350 or memory port 352, and transferred to hard disk 354. Alternatively, the program may be transmitted to computer 340 through network 368 and stored in hard disk 354. The program is loaded to RAM 360 at the time of execution. The program may be directly loaded to RAM 360 from DVD 362, removable memory 364, or through network 368.

The program includes a sequence of instructions consisting of a plurality of instructions causing computer 340 to function as various functional units of speech recognition device 280 in accordance with the embodiments above.

Some of the basic functions necessary to cause computer 340 to operate in this manner may be provided by the operating system running on computer 340, by a third-party program, or dynamically-linkable various programming tool kits or program library installed in computer 340. Therefore, the program itself may not include all functions to realize the system, device and method of the present embodiment. The program may include only the instructions that dynamically call appropriate functions or appropriate program in the programming tool kits or in the program library in a controlled manner to attain a desired result and thereby to realize the functions of the system, device or method described above. Naturally the program itself may provide all necessary functions.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a wide range of appliances having human interface such as a portable telephone, a computer, a drive navigator, home appliances and answering machines, as well as services using such devices.

REFERENCE SIGNS LIST 30 word sequence
32 phoneme sequence
34 state sequence
36 observed sequence
70 DNN
72 input layer
74, 76 hidden layer
78 output layer
100 RNN
110 label sequence (phoneme sequence)
112 symbol sequence
280 speech recognition device
282 input speech
284 recognized speech text
300 A/D converter circuit
302 framing unit
304 feature extracting unit
306 feature storage unit
308 acoustic model
310 decoder
320 TS$^{-\beta}$ LG-WFST
322 hypothesis selecting unit
330 computer system
340 computer
354 hard disk
356 CPU
358 ROM
360 RAM

The invention claimed is:

1. A speech recognition device, comprising:
a processor configured to:
implement an acoustic model based on an End-to-End neural network responsive to an observed sequence formed of prescribed acoustic features obtained from a speech signal, wherein the End-to-End neural network calculates probability of the observed sequence being a certain symbol sequence;
in response to a symbol sequence candidate, calculate a posterior probability of a word sequence corresponding to the symbol sequence candidate;
decode said speech signal based on probabilities calculated by said acoustic model for a plurality of symbol sequences selected based on an input observed sequence, and a posterior probability calculated for each of said plurality of symbol sequences;
in response to a symbol sequence candidate, calculate a posterior probability of a word sequence for the symbol sequence candidate, using an occurrence probability of a word sequence by a word level language model, a posterior probability of said symbol sequence candidate for each word sequence, and an occurrence probability of the symbol sequence candidate by a symbol level language model.

2. The speech recognition device according to claim 1, wherein said acoustic model is an acoustic model based on CTC.

3. The speech recognition device according to claim 1, wherein the processor is further configured to calculate a posterior probability of a word sequence for each symbol candidate by dividing a product of said occurrence probability of a word sequence and the posterior probability of a symbol sequence candidate by the occurrence probability of the symbol sequence.

4. A computer program stored on a non-transitory, machine readable medium, when executed causing a computer to function as the processor described in claim 1.

5. The speech recognition device according to claim 2, wherein said processor calculates a posterior probability of a word sequence for each symbol candidate by dividing a product of said occurrence probability of a word sequence and the posterior probability of a symbol sequence candidate by the occurrence probability of the symbol sequence.

6. The speech recognition device according to claim 2, wherein said processor is further configured to:
convert a sub-word sequence s to and output a word sequence W having a sub-word posterior probability P(s|W) added;
convert the word sequence W to and output a word sequence W having an occurrence probability P(W) based on a language model of word sequence level added;
output a sub-word sequence s having an occurrence probability $P(s)^{-\beta}$ based on a sub-word-level language model added; and
output, as a result of decoding, a hypothesis having the highest score among hypotheses of word sequences received by said WFST, wherein said β is a prescribed scaling factor.

7. The speech recognition device according to claim 1, wherein said processor is further configured to:
convert a sub-word sequence s to and output a word sequence W having a sub-word posterior probability P(s|W) added;
convert the word sequence W to and output a word sequence W having an occurrence probability P(W) based on a language model of word sequence level added;
output a sub-word sequence s having an occurrence probability $P(s)^{-\beta}$ based on a sub-word-level language model added; and output, as a result of decoding, a hypothesis having the highest score among hypotheses of word sequences received by said WFST, wherein said β is a prescribed scaling factor.

8. The speech recognition device according to claim 3, wherein said processor is additionally configured to:
   convert a sub-word sequence s to and output a word sequence W having a sub-word posterior probability P(s|W) added;
   convert the word sequence W to and output a word sequence W having an occurrence probability P(W) based on a language model of word sequence level added;
   output a sub-word sequence s having an occurrence probability $P(s)^{-\beta}$ based on a sub-word-level language model added; and
   output, as a result of decoding, a hypothesis having the highest score among hypotheses of word sequences received by said WFST, wherein said β is a prescribed scaling factor.

9. A speech recognition device, comprising:
   a processor configured to:
   implement an acoustic model based on an End-to-End neural network responsive to an observed sequence formed of prescribed acoustic features obtained from a speech signal, wherein the End-to-End neural network calculates probability of the observed sequence being a certain symbol sequence;
   in response to a symbol sequence candidate, calculate a posterior probability of a word sequence corresponding to the symbol sequence candidate;
   decode said speech signal based on probabilities calculated by said acoustic model for a plurality of symbol sequences selected based on an input observed sequence, and a posterior probability calculated for each of said plurality of symbol sequences;
   convert a sub-word sequence s to and output a word sequence W having a sub-word posterior probability P(s|W) added;
   convert the word sequence W to and output a word sequence W having an occurrence probability P(W) based on a language model of word sequence level added;
   output a sub-word sequence s having an occurrence probability $P(s)^{-\beta}$ based on a sub-word-level language model added; and
   output, as a result of decoding, a hypothesis having the highest score among hypotheses of word sequences received by said processor, wherein said β is a prescribed scaling factor.

* * * * *